US012558622B2

(12) United States Patent
Kobayashi

(10) Patent No.: US 12,558,622 B2
(45) Date of Patent: Feb. 24, 2026

(54) INFORMATION PROCESSING SYSTEM, INFORMATION PROCESSING METHOD, AND COMPUTER PROGRAM

(71) Applicant: SONY INTERACTIVE ENTERTAINMENT INC., Tokyo (JP)

(72) Inventor: Fumiko Kobayashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 326 days.

(21) Appl. No.: 17/418,179

(22) PCT Filed: Jan. 10, 2020

(86) PCT No.: PCT/JP2020/000585
§ 371 (c)(1),
(2) Date: Jun. 24, 2021

(87) PCT Pub. No.: WO2020/149222
PCT Pub. Date: Jul. 23, 2020

(65) Prior Publication Data
US 2022/0080312 A1      Mar. 17, 2022

(30) Foreign Application Priority Data

Jan. 17, 2019      (JP) ................................. 2019-006085

(51) Int. Cl.
*A63F 13/533*          (2014.01)
*A63F 13/48*            (2014.01)
(Continued)

(52) U.S. Cl.
CPC ............ *A63F 13/533* (2014.09); *A63F 13/48* (2014.09); *A63F 13/493* (2014.09);
(Continued)

(58) Field of Classification Search
CPC ...... A63F 13/533; A63F 13/48; A63F 13/493; A63F 13/497; A63F 2300/554; A63F 2300/634; A63F 2300/636; G06F 3/0482
See application file for complete search history.

(56) References Cited

U.S. PATENT DOCUMENTS 8,667,395 B2 *  3/2014  Hosogai ................. A63F 13/10
                                                              715/838
8,920,244 B2 *  12/2014  Koyama ................. A63F 13/69
                                                              463/43
(Continued)

FOREIGN PATENT DOCUMENTS

JP          2011-217803 A      11/2011
JP          2011250874 A      12/2011
(Continued)

OTHER PUBLICATIONS

English translation of KR-101825101-B1 (Year: 2018).*
(Continued)

*Primary Examiner* — Seng H Lim
(74) *Attorney, Agent, or Firm* — Fish & Richardson P.C.

(57) ABSTRACT

A play data storage section 22 stores a plurality of pieces of play data concerning the play situation of a plurality of pieces of contents. A library screen generating section 44 generates a selection screen which allows a user to select a piece of content to be played, and which includes images indicating the play situations for the plurality of pieces of contents, on the basis of the play data stored in the play data storage section 22. An output section 34 causes the selection screen generated by the library screen generating section 44 to be displayed.

20 Claims, 7 Drawing Sheets

(51) Int. Cl.

| | |
|---|---|
| *A63F 13/493* | (2014.01) |
| *A63F 13/497* | (2014.01) |
| *G06F 3/0482* | (2013.01) |
| *A63F 13/35* | (2014.01) |
| *A63F 13/79* | (2014.01) |

(52) U.S. Cl.

CPC .......... *A63F 13/497* (2014.09); *G06F 3/0482* (2013.01); *A63F 13/35* (2014.09); *A63F 13/79* (2014.09); *A63F 2300/308* (2013.01); *A63F 2300/554* (2013.01); *A63F 2300/634* (2013.01); *A63F 2300/636* (2013.01)

(56) References Cited

U.S. PATENT DOCUMENTS

| | | | | |
|---|---|---|---|---|
| 9,421,467 | B2 * | 8/2016 | Miyamoto | A63F 13/822 |
| 9,762,948 | B2 * | 9/2017 | Arriola | H04N 21/47 |
| 10,318,124 | B2 * | 6/2019 | Kobayashi | G06F 3/04817 |
| 2004/0155898 | A1 * | 8/2004 | Taguchi | G06F 16/50 348/E7.071 |
| 2007/0233377 | A1 * | 10/2007 | Salay | G06F 3/0481 701/438 |
| 2009/0011838 | A1 * | 1/2009 | Miyamoto | A63F 13/493 463/43 |
| 2009/0118022 | A1 * | 5/2009 | Lyons | G06Q 30/02 463/42 |
| 2010/0107150 | A1 * | 4/2010 | Kamada | H04M 1/72472 715/822 |
| 2010/0255917 | A1 * | 10/2010 | Nemoto | A63F 13/69 463/43 |
| 2011/0092280 | A1 * | 4/2011 | Koyama | A63F 13/75 463/29 |
| 2011/0093888 | A1 * | 4/2011 | Araki | H04N 21/4858 725/37 |
| 2011/0107220 | A1 | 5/2011 | Perlman | |
| 2011/0252361 | A1 * | 10/2011 | Tsuda | G06F 9/451 715/781 |
| 2012/0072867 | A1 * | 3/2012 | Schlegel | G06F 3/0482 715/808 |
| 2012/0093476 | A1 | 4/2012 | Mountain | |
| 2012/0233564 | A1 * | 9/2012 | Tsuchiya | A63F 13/35 715/772 |
| 2015/0080120 | A1 * | 3/2015 | Hayashida | A63F 13/77 463/43 |
| 2015/0141139 | A1 | 5/2015 | Trombetta et al. | |
| 2015/0271555 | A1 * | 9/2015 | Arriola | H04N 21/42204 725/37 |
| 2015/0370456 | A1 * | 12/2015 | Kobayashi | G06F 3/0489 463/32 |
| 2018/0361252 | A1 * | 12/2018 | Tsuda | G06F 3/0484 |
| 2019/0022529 | A1 * | 1/2019 | Shimizu | A63F 13/493 |
| 2021/0346797 | A1 * | 11/2021 | Tsuchikawa | A63F 13/48 |

FOREIGN PATENT DOCUMENTS

| | | | | |
|---|---|---|---|---|
| JP | 2014-121610 A | 7/2014 | | |
| JP | 2014-236874 A | 12/2014 | | |
| JP | 2015-16104 A | 1/2015 | | |
| JP | 2016-504644 A | 2/2016 | | |
| JP | 6281082 B1 | 2/2018 | | |
| JP | 2018125022 A | 8/2018 | | |
| KR | 101825101 B1 * | 3/2018 | | A63F 13/70 |
| WO | 2014/130321 A3 | 8/2014 | | |

OTHER PUBLICATIONS

Notice of Reasons for Refusal dated Aug. 2, 2022, from Japanese Patent Application No. JP 2019-006085, 4 sheets.

Decision to Grant a Patent dated Jan. 24, 2023, from Japanese Patent Application No. 2019-006085, 2 sheets.

International Search Report and Written Opinion mailed Mar. 10, 2020, from PCT/JP2020/000585, 17 sheets.

International Preliminary Report on Patentability mailed Jul. 29, 2021, from PCT/JP2020/000585, 24 sheets.

* cited by examiner

MANAGEMENT SERVER  102

104

200a  GAME DEVICE

200b  GAME DEVICE

200c  GAME DEVICE

. . . .

200

MULTIMEDIA REPRODUCTION SYSTEM 100

INFORMATION PROCESSING SYSTEM, INFORMATION PROCESSING METHOD, AND COMPUTER PROGRAM

TECHNICAL FIELD

The present invention relates to a data processing technology, particularly to an information processing system, an information processing method, and a computer program.

BACKGROUND ART

Various types of selection screens have been proposed for allowing a user to select electronic content to be processed in a device that processes electronic content such as a video or music (see PTL 1, for example).

CITATION LIST

Patent Literature

[PTL 1]
JP 2016-504644T

SUMMARY

Technical Problems

In recent years, many cooperative type games and competitive type games in which a plurality of users participate via a network have been provided, and in such games, as more users participate, interest in the game is more enhanced. In such a situation, there is a further demand for a user interface that promotes the use of electronic content.

The present invention has been made in view of these problems, and one object is to provide a user interface that promotes the use of electronic content.

Solution to Problems

To solve the above problems, the information processing system of one aspect of the present invention is provided with a storage section that stores a plurality of pieces of play data related to play situations of a plurality of pieces of content, a generating section that generates a selection screen allowing a user to select a piece of content to be played, and an output section that causes the selection screen generated by the generating section to be displayed. The generating section generates the selection screen including an image indicating the play situations of the plurality of pieces of of contents, on the basis of the play data stored in the storage section.

Another aspect of the present invention is also an information processing system. This information processing system is provided with a storage section that stores a plurality of pieces of play data related to play situations of a plurality of pieces of contents, a generating section that generates a selection screen allowing a user to select a piece of content to be played, and an output section that causes the selection screen generated by the generating section to be displayed. The generating section generates additional information determined on the basis of a play situation of specific content in response to an operation on the specific content on the selection screen, the output section causing the additional information to be displayed on the selection screen, the generating section generates a detail screen indicating a detail of the specific content in response to an operation on the specific content for which the additional information is displayed, and the output section causes the detail screen to be displayed in place of the selection screen.

Yet another aspect of the present invention is also an information processing system. This information processing system is provided with a storage section that stores a plurality of pieces of play data related to play situations of a plurality of pieces of contents, a generating section that generates a selection screen which allows a user to select a piece of content to be played and in which a plurality of objects corresponding to the plurality of pieces of contents are arranged, and an output section that causes the selection screen generated by the generating section to be displayed. The selection screen includes a plurality of alignment standards. The generating section generates the selection screen in which the plurality of objects are rearranged according to the alignment standard selected by the user among the plurality of alignment standards, and the plurality of alignment standards include an alignment standard based on the play situation.

Yet another aspect of the present invention is an information processing method. In this method, a computer executes a step of storing a plurality of pieces of play data related to play situations of a plurality of pieces of contents, a step of generating a selection screen allowing a user to select a piece of content to be played, and a step of causing the generated selection screen to be displayed, and the generating step includes generating the selection screen including an image indicating the play situations of the plurality of contents, on the basis of the stored play data.

It should be noted that any combination of the above components and the conversion of the expression of the present invention between a device, a method, a computer program, a recording medium in which the computer program is readably recorded, and the like are also effective as aspects of the present invention.

Advantageous Effect of Invention

According to the present invention, a user interface that promotes the use of electronic content can be provided.

DESCRIPTION OF EMBODIMENT

The information processing device according to the embodiment (game device 200 to be described later) provides a user interface in a mode that brings new discoveries and awareness to a user and promotes the use of electronic content. The information processing device of the embodiment is a set-top game device (game device 200) placed in the user's home and operated by the user. As a modification example, the user device may be a portable game device, a PC (Personal Computer), a smartphone, or a tablet terminal.

Figure 1:
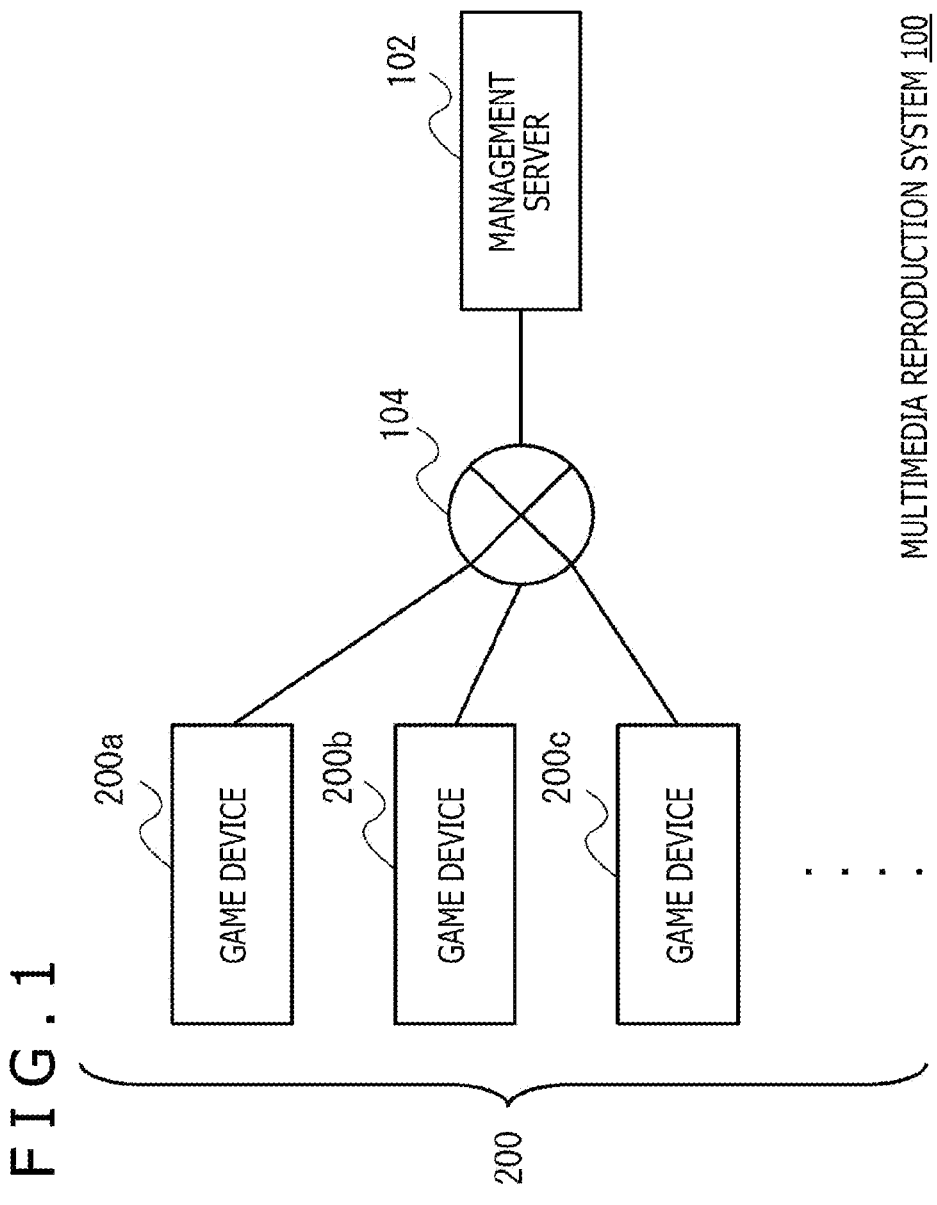
FIG. 1 is a diagram illustrating a configuration of a multimedia reproduction system according to an embodiment.

FIG. 1 illustrates a configuration of a multimedia reproduction system 100 according to the embodiment. The multimedia reproduction system 100 includes a plurality of game devices 200 for reproduction of multimedia data (various types of digital data), and a management server 102. The plurality of game devices 200 include a game device 200*a*, a game device 200*b*, and a game device 200*c* operated by different users. The game device 200 and the management server 102 are connected via a communication network 104 including a LAN (Local Area Network), a WAN (Wide Area Network), the Internet, and the like.

The management server 102 includes a storage unit (not illustrated) that stores data related to electronic content processing in the plurality of game devices 200. The data relating to the electronic content processing in the embodiment is one or more pieces of data relating to each play situation of one piece of or more pieces of electronic content (hereinafter, also referred to as "play data"). The play data includes recorded data of the play situation of each electronic content at the time of saving. For example, the play data may include a user level (user skill level, user character ability level, etc.). In addition, the play data may include statistical information regarding total play time, average play time per day, and achievement situation of missions (quests), or the like.

The management server 102 is further provided with a game plan determination unit that determines a recommended game plan (for example, a mission, a quest, or a stage in a game) for each game device 200 (user of each game device 200) on the basis of the play data of each game device 200 stored in the storage unit. Further, the management server 102 further includes a game plan transmission unit that transmits a game plan recommended to each user, determined by the game plan determination unit to each game device 200. The game plan determination unit and the game plan transmission unit can also be referred to as the recommended information determination unit and the recommended information transmission unit.

Figure 2:
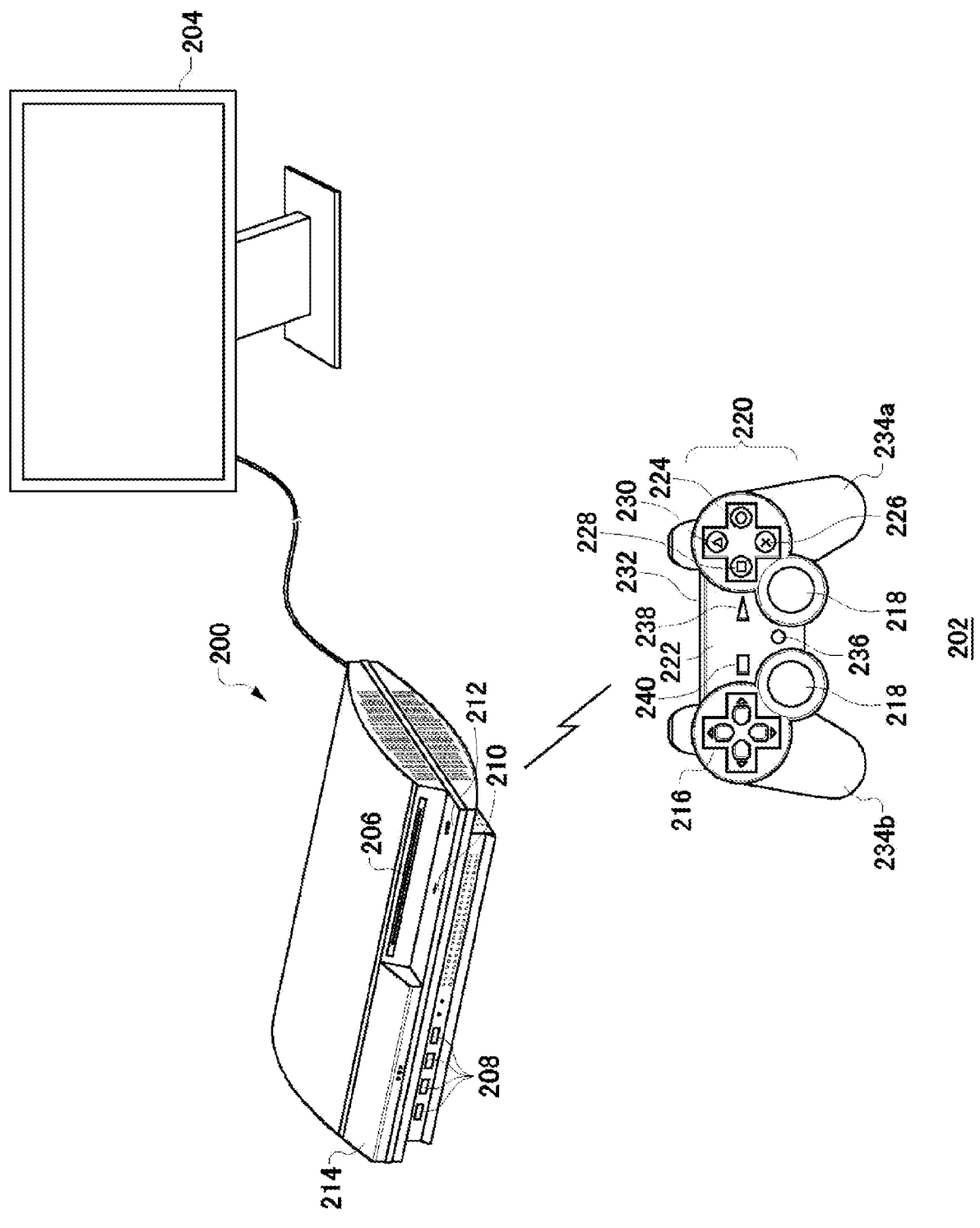
FIG. 2 is a diagram illustrating an external configuration of a game device in FIG. 1.

FIG. 2 illustrates an external configuration of the game device 200 in FIG. 1. The game device 200 is connected to a controller 202 and a television monitor 204. The game device 200 has functions of execution of a game, creation and editing of an e-mail, browsing of a Web page, reproduction of a video and music, and the like. The controller 202 is wirelessly connected to the game device 200. The television monitor 204 is connected to the game device 200, displays a game screen, a Web page, a movie, or the like, and also outputs sound. Although not illustrated in FIG. 2, the game device 200 is connected to the Internet by being connected to a communication device such as a router by wire or wirelessly.

The game device 200 includes a disk insertion slot 206 corresponding to an optical disc having a diameter of 12 cm, a USB (Universal Serial Bus) connection terminal 208, and the like. The disk insertion slot 206 is configured such that an optical disc such as a BD (Blu-ray Disc), DVD-ROM (Digital Versatile Disc-Read-Only Memory), or CD (Compact Disc)-ROM can be loaded. A touch sensor 210 is a sensor for taking out a disc, and a touch sensor 212 is a sensor for turning on/off the power supply. Although not illustrated, a power switch, an acoustic video output terminal, an optical digital output terminal, an AC (Alternate Current) power input terminal, a LAN port, an HDMI (High-Definition Multimedia Interface) terminal (HDMI is a registered trademark), etc. are provided on the back side of the game device 200. In addition, an IEEE (Institute of Electrical and Electronic Engineers) 1394 terminal is provided so as to enable communication with IEEE1394.

The game device 200 also has a multimedia slot. A multimedia slot case 214 is a cover member, and although not illustrated, the multimedia slot case 214 has a structure such that the multimedia slot is exposed when the multimedia slot case 214 is opened.

The game device 200 executes various type of processing for a game execution, creation, editing and reception of an e-mail, browsing of a Web page, etc., in response to an application program for a game, an e-mail, a Web browser and an instruction from a user via the controller 202. The application program may be read from various types of recording media including an optical disc such as a CD-ROM, a DVD-ROM, and a BD, a hard disk drive, a semiconductor memory, and the like or may be downloaded via various types of transmission media such as a LAN or a CATV (Cable Television) line.

Further, the game device 200 not only executes a game, creation, editing and reception of an e-mail, browsing of a Web page, or the like on the basis of an application program, but also can perform reproduction from (decoding) audio data recorded on a CD, and video and audio data of a movie or the like recorded in a DVD or a BD, for example. Further, the game device 200 can also operate on the basis of various types of other application programs. Incidentally, the driver program for reproduction of a DVD or a BD is recorded in a hard disk drive 334 built in the game device 200, for example.

The controller 202 is driven by a battery not illustrated and includes a plurality of buttons and keys for performing an operation input for advancing a game or the like. When the user operates the buttons or the keys of the controller 202, the operation input is transmitted to the game device 200 wirelessly or by wire.

The controller 202 is provided with a direction key 216, analog sticks 218, and four types of operation buttons 220. The direction key 216, the analog sticks 218, and the operation buttons 220 are input units provided on a housing upper surface 222. Four types of buttons 224, 226, 228, and 230 are marked with different figures in different colors in order to distinguish these from each other. That is, a circle button 224 is marked with a red circle, a cross button 226 is marked with a blue cross, a square button 228 is marked with a purple square, and a triangle button 230 is marked with a green triangle. Although not illustrated, a plurality of LEDs (light-emitting diodes) are provided on a housing back surface 232 of the controller 202.

The user grips a left grip 234*b* with the left hand and grips a right grip 234*a* with the right hand to operate the controller 202. The direction key 216, the analog sticks 218, and the operation buttons 220 are provided on the housing upper surface 222 so as to be capable of being operated by the user while the user is gripping the left grip 234*b* and the right grip 234*a*.

A button with an LED (hereinafter, referred to as a "PS button 236") is also provided on the housing upper surface 222. In the embodiment, the PS button 236 is used as a button for making a screen transition between a home screen and another screen on the game device 200. In addition, the button has a function of notifying the user of an incoming mail by the light emitting state of the LED and a function of indicating a charging state of a battery of the controller 202. For example, the LED is lit in red during charging, in green after the charging is completed, and blinks in red when the remaining charge amount is low. Further, a select button 240 and a start button 238 are also provided on the housing upper surface 222, and predetermined functions are assigned.

The direction key 216 is provided with "up," "down," "left," and "right" direction instruction keys that the user operates at the time of, for example, moving a game character of the game in the up/down/left/right directions on the screen, moving a text entry cursor in the up/down/left/right directions on an e-mail creation screen, or scrolling pages while browsing a Web page, and moving the cursor on the screen in the up/down/left/right directions. Note that the "up," "down," "left," and "right" direction instruction keys are used not only for up/down/left/right direction instruction but also for diagonal direction instructions. For example, by simultaneously pressing the "up" direction instruction key and the "right" direction instruction key, the user can give a direction instruction of a diagonally upper right direction to the game device 200. The same goes for the other direction instruction keys and for example, by pressing the "down" direction instruction key and the "left" direction instruction key at the same time, the user can give a diagonally lower left direction instruction to the game device 200.

Different functions are assigned to the operation buttons 220 depending on the application program. In the embodiment, the function for designating the display of the menu is assigned to the triangle button 230. The function for designating the cancellation of the selected item or return is assigned to the circle button 224. The function for designating the determination of the selected item is assigned to the cross button 226. The function for designating display/non-display of a table of contents and the like is assigned to the square button 228. As modification examples, the function for designating the determination of the selected item may be assigned to the circle button 224, and the function for designating the cancellation of the selected item may be assigned to the cross button 226.

The analog stick 218 has a rotary operation element capable of being tilted in any direction around a rotation fulcrum of an operation shaft, and variable analog value output means that outputs a variable analog value according to the operation on the rotary operation element. The rotary operation element is attached to a tip side of the operation shaft mounted so as to return in a neutral position by an elastic member. The rotary operation element holds the position (reference position) in an upright state (no tilting state) when the tilting operation is not performed by the user. The variable analog value output means includes a variable resistance element and the like. The resistance value of the variable resistance element changes according to the operation of the rotary operation element. When the rotary operation element of the analog stick 218 is tilted, the controller 202 detects coordinate values on the XY coordinates according to the tilt amount and the tilt direction with respect to the reference position, and sends the coordinate values to the game device 200 as an operation output signal.

Figure 3:
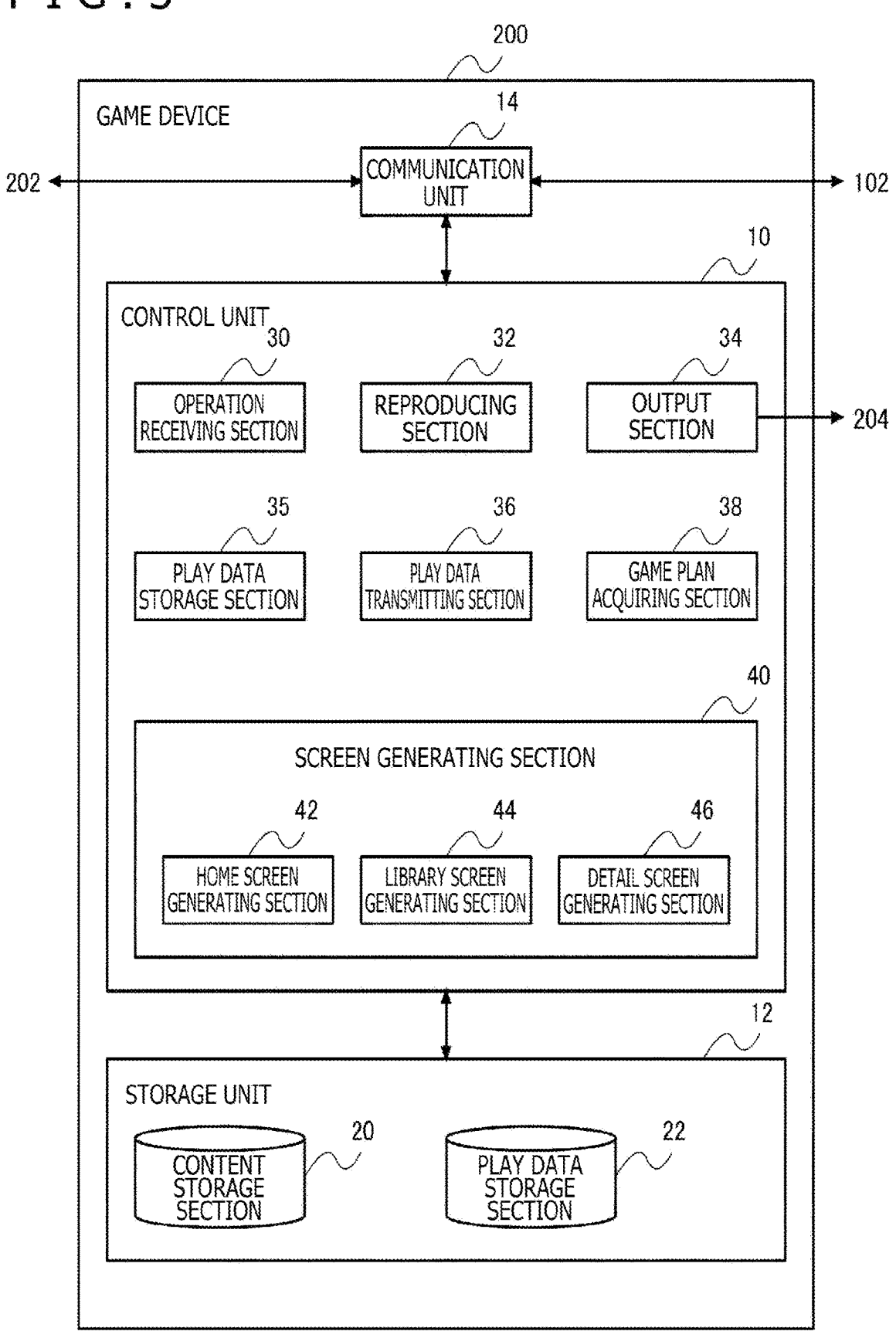
FIG. 3 is a block diagram illustrating functional blocks of the game device in FIG. 1.

FIG. 3 is a block diagram illustrating functional blocks of the game device 200 in FIG. 1. The plurality of functional blocks illustrated in the block diagram of the present specification can be configured by a circuit block, a memory, and other LSIs (Large Scale Integrations) in terms of hardware, and is achieved by a CPU (Central Processing Unit) executing a program loaded in the memory, or the like in terms of software. Therefore, it is understood by those skilled in the art that these functional blocks can be achieved in various ways by hardware only, software only, or a combination thereof, and is not limited to any of these.

The game device 200 includes a control unit 10, a storage unit 12, and a communication unit 14. The control unit 10 executes various types of data processing to control the operation of the game device 200. The storage unit 12 stores data that is referenced or updated by the control unit 10. The communication unit 14 communicates with an external device according to a predetermined communication protocol. The control unit 10 transmits/receives data to/from the management server 102 and the controller 202 via the communication unit 14.

The storage unit 12 includes a content storage section 20 and a play data storage section 22. The content storage section 20 stores data of electronic content (for example, a game) installed in the game device 200. The electronic content data includes a computer program (e.g., a game executable form file) for executing the electronic content.

The play data storage section 22 stores a plurality of pieces of play data relating to each play situation of a plurality of pieces of electronic content installed in the game device 200. As described above, the play situation of each electronic content at the time of saving is recorded in each piece of play data. The play situation at the time of saving may include, for example, a progress situation of the game, contents of the user operation, the movement of the character, and the like. Further, the play data of the embodiment includes a video indicating the game contents at the moment near the saving time (approximately several seconds).

The control unit 10 includes an operation receiving section 30, a reproducing section 32, an output section 34, a play data transmitting section 36, a game plan acquiring section 38, and a screen generating section 40. At least some of these functional blocks may be implemented as a module of a computer program (for example, an OS (Operating System) program of the game device 200 or a game application). This computer program may be installed in the storage unit 12. The CPU and GPU (Graphics Processing Unit) of the game device 200 may exert the function of each functional block by reading the computer program into a main memory and executing the program.

The operation receiving section 30 receives a signal transmitted from the controller 202 and indicating an operation input into the controller 202 by the user.

The reproducing section 32 executes the reproduction processing of the electronic content designated by the user in accordance with the operation of the user received by the operation receiving section 30. For example, the reproducing section 32 generates game screen data indicating the process and result of the game by executing the electronic content data (for example, a game program) stored in the content storage section 20.

The output section 34 outputs the reproduction result of the electronic content generated by the reproducing section 32 to the television monitor 204, and causing the television monitor 204 to display the reproduction result of the electronic content. For example, the output section 34 outputs the game screen data generated by the reproducing section 32 to the television monitor 204, and causes the television monitor 204 to display the game screen. Further, the output section 34 outputs the data of the home screen, a library screen, and a detail screen generated by the screen generating section 40 to be described later to the television monitor 204, and causes the television monitor 204 to display these screens.

In a case where a user operation giving instructions to save data is input during the play of the game, a play data storage section 35 stores the play data indicating the play situation at that point in time in the play data storage section 22.

The play data transmitting section 36 registers the play data stored in the play data storage section 22 in the management server 102 together with the identification information of the own machine at a predetermined timing. For example, the play data transmitting section 36 may transmit the play data to the management server 102 for registration at the time of storing the play data or periodically.

The game plan acquiring section 38 acquires from the management server 102 information regarding recommendation to the user (game plan data recommended to the user in the embodiment) determined by the management server 102. The game plan data includes data indicating a recommended reproduction zone of electronic content (which can be said to be one reproduction unit, for example, a mission, a quest, a stage, etc., in the game), and attribute information regarding the recommended reproduction zone.

The screen generating section 40 generates screen data including various pieces of information regarding electronic content that can be reproduced in the game device 200. The screen generating section 40 includes a home screen generating section 42, a library screen generating section 44, and a detail screen generating section 46.

The home screen generating section 42 generates data for the home screen, which is the first screen when the game device 200 is started. The home screen may be a screen in which a plurality of icons (which can also be said to be thumbnails) indicating a plurality of pieces of electronic content reproducible in the game device 200 are arranged in a reproduction order (which can also be said to be an execution order). Incidentally, the home screen may be displayed even in a case where a predetermined operation (for example, pressing the PS button 236) is input during game reproduction.

In a case where an icon corresponding to a specific electronic content is selected on the home screen, the reproducing section 32 starts reproducing the electronic content corresponding to the selected icon, and the output section 34 causes the reproduction result to be displayed. An icon (library icon) for transitioning to the library screen is further arranged on the home screen.

The library screen generating section 44 generates data on the library screen, which is a selection screen for allowing the user to select the content to be played. As will be described later, the library screen generating section 44 generates a library screen including images indicating the play situation of each of the plurality of pieces of content on the basis of the play data of the plurality of pieces of electronic content stored in the play data storage section 22.

The detail screen generating section 46 generates detail screen data indicating detailed information regarding the specific electronic content in a case where a predetermined user operation for the specific electronic content displayed on the library screen is input.

The operation of the multimedia reproduction system 100 with the above configuration will be described. When the game device 200 is started, or in a case where a predetermined operation is input on the game screen, the home screen generating section 42 generates the home screen, and the output section 34 causes the home screen to be displayed. When the user selects a desired game on the home screen of the game device 200, the reproducing section 32 executes the program of the selected game to generate the game screen. The output section 34 causes the game screen to be displayed.

When a user operation giving instructions to save data is input, the play data storage section 35 stores play data indicating the play situation at that point in time in the play data storage section 22. The play data of the embodiment includes an image indicating the situation at the time of saving (specifically, a video for several seconds before and after the saving time). In addition, the play data includes statistical information such as total play time, average play time per day, and achievement situation of missions (quests). The play data storage section 35 updates the statistical information of the game to be saved. Note that such statistical information may be updated on the management server 102 side.

The play data transmitting section 36 transmits the play data (including the above statistical information) stored in the play data storage section 22 to the management server 102. The management server 102 stores the play data transmitted from each game device 200, in association with each game device 200. The management server 102 determines a game plan recommended to the user of each game device 200 on the basis of the play data transmitted from each game device 200.

For example, the management server 102 may determine a mission with a difficulty level that matches the user's level as a game plan to be recommended. Further, the management server 102 may determine a quest in which the average time required to achieve the goal matches the average play time of the user as a game plan to be recommended among the plurality of quests in the game. The management server 102 stores a recommended game plan for each game device 200 (user) in association with each user.

In a case where the game to be reproduced is not found on the home screen of the game device 200, the user selects the library icon arranged on the home screen. When the selecting operation for the library icon is input, the library screen generating section 44 generates the library screen. The output section 34 causes the library screen to be displayed instead of the home screen.

Figure 4:
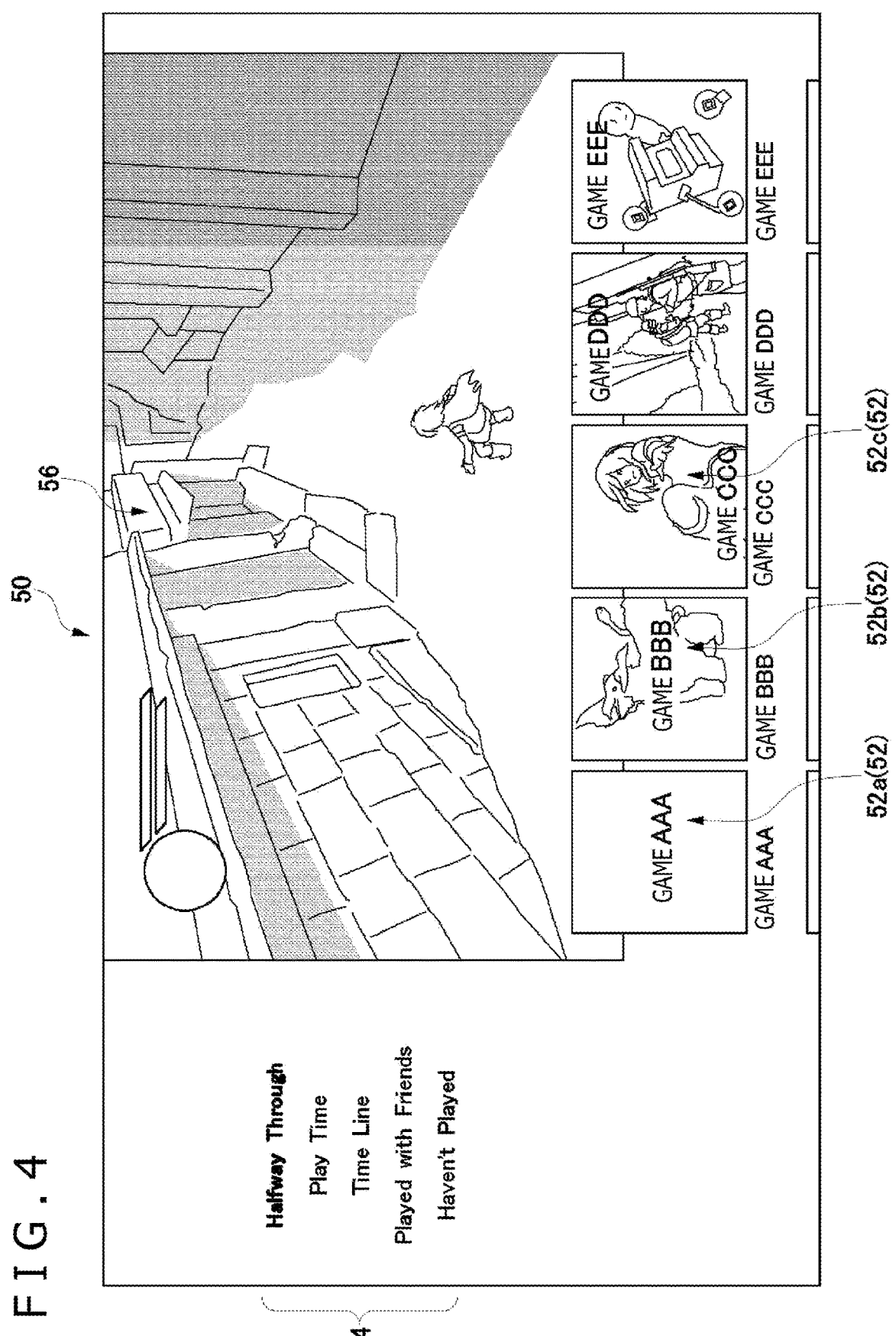
FIG. 4 is a diagram illustrating an example of a library screen.

FIG. 4 illustrates an example of the library screen. A plurality of cards 52 (52a, 52b, 52c, etc.), which are icons indicating a plurality of games that can be reproduced by the game device 200 are arranged on a library screen 50. Further, a plurality of objects for designating the alignment standard of the cards 52 (hereinafter, referred to as "alignment standard 54") are provided on the library screen 50 in order to assist the user in determining the game to be reproduced (in other words, the card to be selected).

The library screen generating section 44 generates a new library screen 50 for display, in which the plurality of cards 52 are rearranged according to the alignment standard 54 selected by the user among the plurality of alignment standards 54. In other words, in a case where the alignment standard 54 is switched on the library screen 50, the library screen generating section 44 generates a new library screen 50 in which a plurality of cards 52 are rearranged according to the alignment standard 54 after the switching.

The plurality of alignment standards 54 include alignment standard based on the play situation of each content indicated by the play data of each content stored in the play data storage section 22. To be specific, "Halfway Through," which is one alignment standard 54, extracts a game that is halfway through the play (for example, a game saved in the middle of the story without being cleared to the end of the story) from a plurality of games, and aligns the cards 52 corresponding to the games that are halfway through the play. In the embodiment, one or more cards 52 corresponding to the games that are halfway through the play are arranged from the upper left in the order of play date and time from the latest. In "Halfway Through," games that have been cleared to the end become games excluded from the alignment, namely, non-displayed games.

Further, "Play Time," which is one alignment standard 54, aligns a plurality of cards 52 according to the length of time for play. In the embodiment, the cards are arranged from the upper left in descending order of playing time. "TIme Line," which is one alignment standard 54, arranges a plurality of cards 52 from the upper left in the order of play date and time from the latest. Unlike "Halfway Through," "TIme Line" aligns the cards 52 of both the games that are halfway through the play and the games having been cleared.

Further, "Played with Friends," which is one alignment standard 54, extracts a game that a user plays with a friend (for example, multi-play, cooperative play, remote play, etc.) from a plurality of games that can be reproduced in the game device 200, and the cards 52 corresponding to the extracted games are arranged. In the embodiment, one or more cards 52 corresponding to the game played by the user with a friend are arranged from the upper left in the order of date and time when the game has been played together from the latest.

Further, "Haven't Played," which is one alignment standard 54, extracts games that the user has never played from a plurality of games reproducible in the game device 200, and cards 52 corresponding to the extracted games are arranged. In the embodiment, one or more cards 52 corresponding to the games that the user has never played are arranged from the upper left in the order of the installation date and time of the game in the game device 200 from the latest. In the embodiment, the games that have been played even once in the past are excluded from the alignment target and are made non-displayed. As a modification example, the "Haven't Played" may extract games that have not been played for a predetermined period of time (for example, two weeks) or more regardless of whether the games have been played in the past.

FIG. 4 illustrates the library screen 50 generated by the library screen generating section 44 and displayed by the output section 34 in a case where "Halfway Through" is selected from the alignment standards 54. The library screen 50 in the figure includes a play video 56. The play video 56 is a video exhibiting the play situation of each of a plurality of games indicated by the plurality of cards 52 displayed on the library screen 50. The library screen generating section 44 generates the play video 56 on the basis of the play situation at the time of saving stored in the play data storage section 22 for a plurality of games indicated by the plurality of cards 52 displayed on the library screen 50.

To be specific, the library screen generating section 44 generates the play video 56 by linking the play videos of the plurality of games before and after the time for saving (for example, a video for five seconds) stored in the play data storage section 22. For example, the play video 56 in FIG. 4 sequentially reproduces the play contents before and after the saving time of the three games indicated by the card 52a, the card 52b, and the card 52c. The library screen generating section 44 arranges the generated play video 56 on the library screen 50. As a modification example, the library screen generating section 44 may reproduce the play videos of a plurality of games in order, and display the play video of each game in order in the area of the play video 56 illustrated in FIG. 4 while switching the reproduction results.

Note that the library screen generating section 44 may set the card 52 corresponding to the game whose play video 56 is being displayed to a mode indicating that the play video is being displayed. For example, a predetermined indicator (mark or the like) indicating that the play video is being displayed may be added to the card 52 corresponding to the game whose play video 56 is being displayed.

By displaying the play video 56 on the library screen 50 in this way, it becomes easier for the user to recognize the play situation of each electronic content, for example, what kind of play has been performed at the time of saving. This can support the user's decision-making to determine the content to be reproduced.

Figure 5:
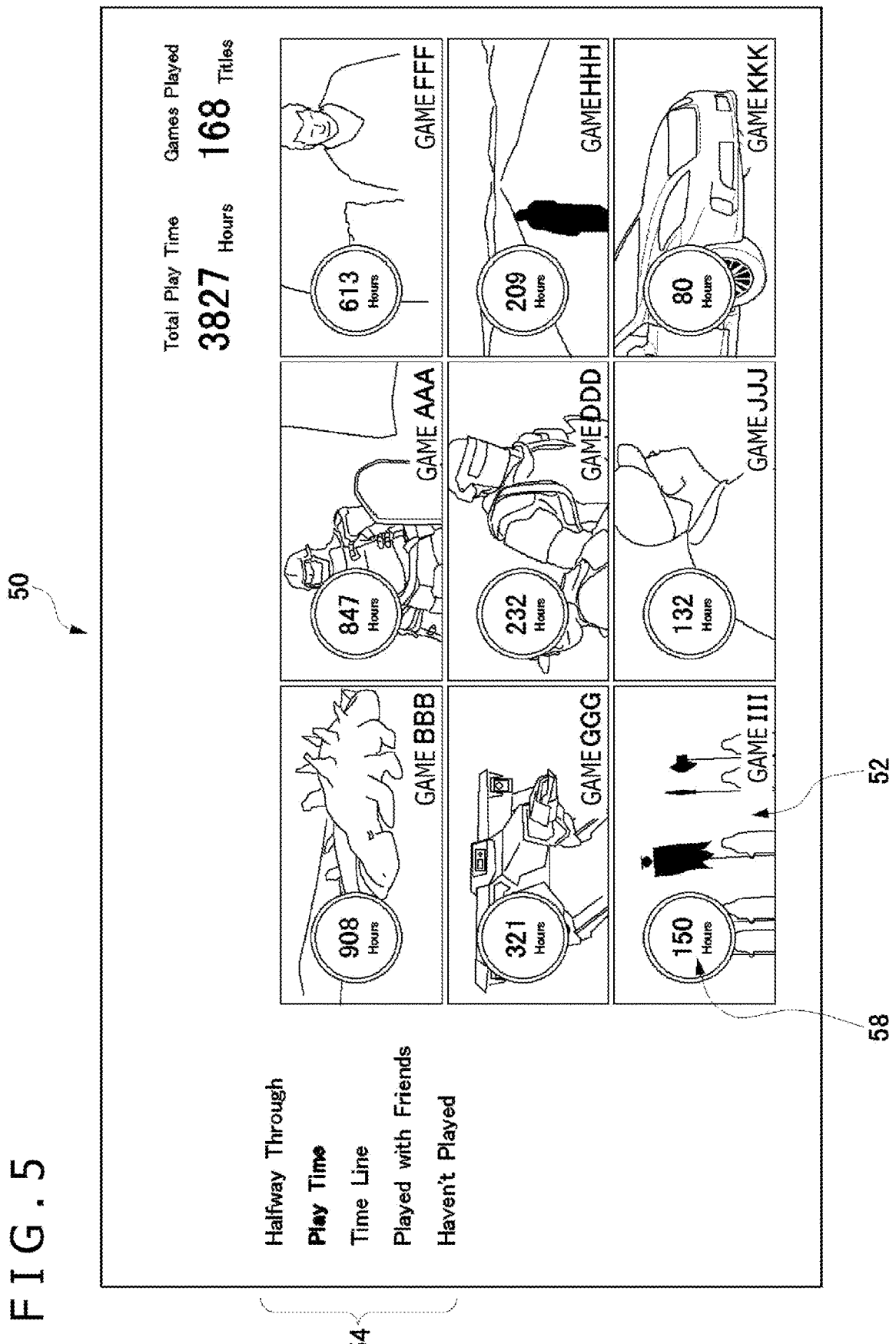
FIG. 5 is a diagram illustrating another example of the library screen.

FIG. 5 illustrates an example of the library screen 50. The figure illustrates the library screen 50 that is generated and displayed in a case where "Play Time" is selected from the alignment standards 54. The library screen generating section 44 generates the library screen 50 in which a plurality of cards 52 indicating a plurality of games are arranged from the upper left in descending order of play time. Further, the library screen generating section 44 acquires the total play time of each game from the play data storage section 22, and arranges a play time indicator 58 indicating the total play time of the corresponding game on each card 52. For example, it is indicated that the game BBB in the figure has been played for 908 hours so far.

In this way, the arrangement order of the plurality of cards 52 is switched by the user switching the alignment standards 54 on the library screen 50. Further, information indicating a play situation is also added and displayed on the library screen 50, such as the play video 56 illustrated in FIG. 4 and the play time indicator 58 illustrated in FIG. 5. This can support the user's decision-making to determine the content to be reproduced.

In a case where the first operation for specific content is input on the library screen 50, the library screen generating section 44 generates additional information (a pop-up menu 60 in the embodiment) indicating a recommended reproduction zone determined on the basis of the play situation of the specific content. The output section 34 causes additional information to be displayed with the additional information superimposed on the library screen 50. The first operation may be to focus on the card 52 indicating the specific content with a cursor or the like on the library screen 50. Alternatively, the operation may be a predetermined button operation (for example, pressing the cross button 226) after the focusing.

Figure 6:
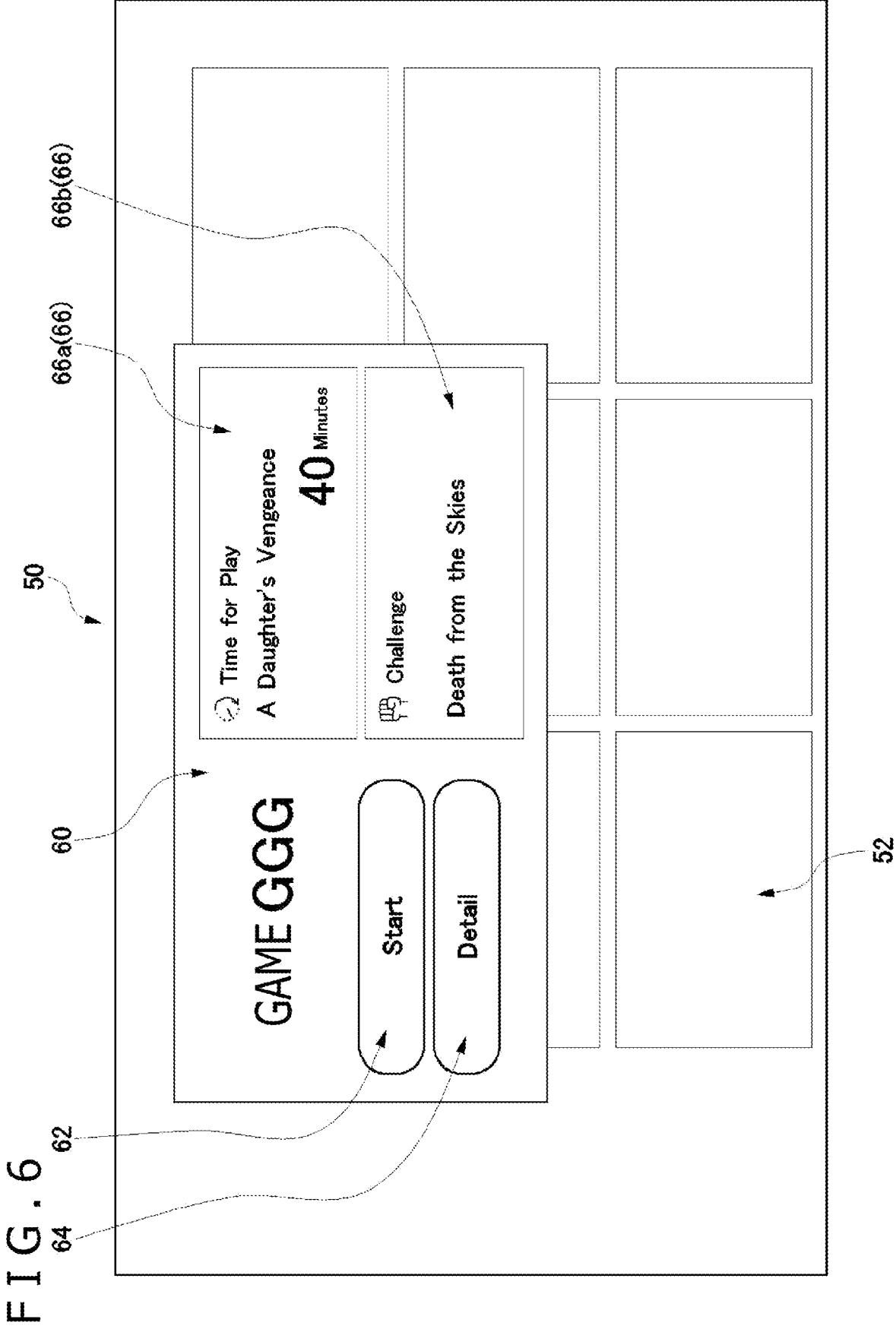
FIG. 6 is a diagram illustrating a further example of the library screen.

FIG. 6 illustrates an example of the library screen 50. The figure illustrates the library screen 50 displayed in a case where a first operation is input on a card 52 indicating game GGG. The library screen 50 of the figure includes the pop-up menu 60. The pop-up menu 60 includes a start button 62, a detail button 64, and a plurality of game plans 66. The game plan 66 is an object (which can also be said to be an image or an item) indicating a recommended reproduction zone (a mission, a quest, an event, etc.) in the game GGG.

When the first operation for the card 52 indicating the game GGG is input on the library screen 50 illustrated in FIGS. 4 and 5, the game plan acquiring section 38 acquires from the management server 102 the data of the plurality of game plans that the management server 102 determines according to the play data of the game GGG in its own machine. As a modification example, the game plan acquiring section 38 may acquire data of a plurality of game plans determined by the management server 102 in advance and may cause the storage unit 12 to store the data.

In the embodiment, priority (in other words, recommendation level to the user) is set for a plurality of game plans. The management server 102 sets a higher priority for a game plan having a higher degree of conformity with the user's play situation (a play time, a user level, etc.). The library screen generating section 44 sets two game plans having a relatively high priority among the plurality of game plans acquired by the game plan acquiring section 38 in the pop-up menu 60 (a game plan 66a and a game plan 66b in FIG. 6). That is, some of the plurality of game plans determined by the management server 102 is displayed in the pop-up menu 60.

For example, the game plan 66a in FIG. 6 illustrates a mission for which the average time required for clearing is approximately 40 minutes, which is determined according to the average play time of the user which is 40 minutes. In addition, the game plan 66b indicates a mission with a difficulty level in conformity with the user's level. When a user operation for selecting one game plan 66 in the pop-up menu 60 is input, the reproducing section 32 starts reproduction processing of the game reproduction zone (a mission, a quest, an event, etc.) indicated by the selected game plan 66. The output section 34 causes the result of the reproduction processing by the reproducing section 32 to be displayed.

Further, when a user operation for selecting the start button 62 in the pop-up menu 60 (for example, pressing the cross button 226) is input, the reproducing section 32 executes normal reproduction processing of the game (the game GGG in FIG. 6) indicated by the pop-up menu 60. Further, when a second operation for the content for which the pop-up menu 60 is displayed, that is, a user operation for selecting the detail button 64 in the pop-up menu 60 is input in the embodiment, the detail screen generating section 46 generates the data of the detail screen displaying the details of the game (the game GGG in FIG. 6) indicated by the pop-up menu 60. The output section 34 causes a detail screen to be displayed instead of the library screen 50 in FIG. 6.

Figure 7:
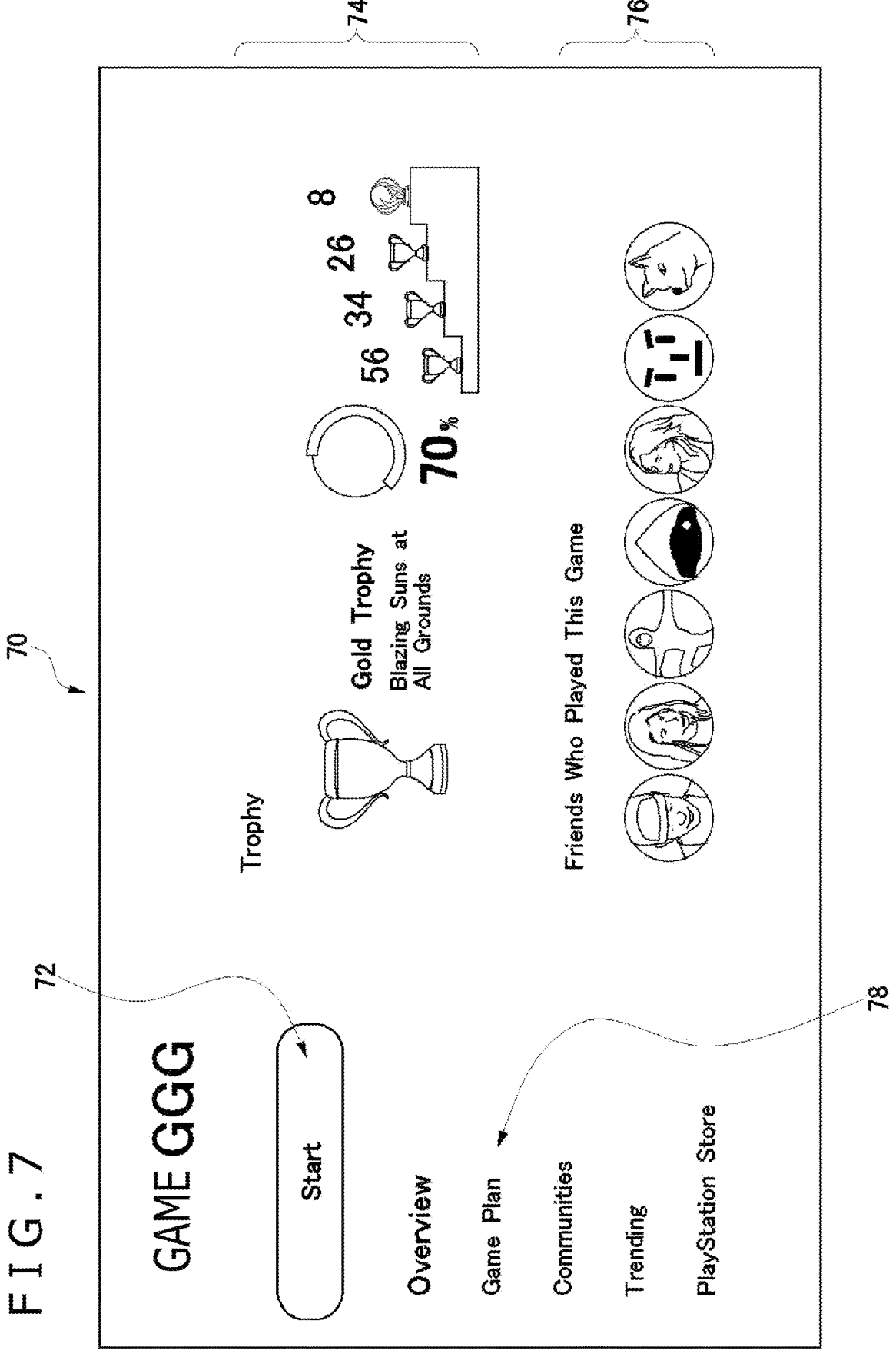
FIG. 7 is a diagram illustrating an example of a detail screen.

FIG. 7 illustrates an example of a detail screen. A detail screen 70 includes trophy information 74 and friend information 76. The trophy information 74 is information indicating trophies acquired by the user (that is, an index indicating the achievement degree in the game software). The friend information 76 is information regarding friends who have played the game (the game GGG in FIG. 7) together. Further, when a user operation for selecting a start button 72 (for example, pressing the cross button 226) is input on the detail screen 70, the reproducing section 32 executes normal reproduction processing of the game (game GGG in FIG. 7) indicated by the detail screen 70.

Further, when a user operation for selecting a game plan menu 78 on the detail screen 70 (for example, pressing the cross button 226) is input, the detail screen generating section 46 generates a new detail screen that includes a list of a plurality of game plans determined by the management server 102. The plurality of game plans displayed on the detail screen include both the game plans 66 displayed in the pop-up menu 60 in FIG. 6 and non-displayed game plans in the pop-up menu 60 (namely, the game plans having a relatively low priority). That is, more game plans than ones in the pop-up menu 60 are displayed on the detail screen 70.

In the embodiment, the recommended game plans determined according to the play situation of the user is presented to the user on the library screen 50 before the transition to the detail screen 70. As a result, the user can confirm the recommended game plans with few operations, and can reproduce the content indicated by the game plan with few operations.

Hereinabove, the present invention has been described based on embodiments. These embodiments are examples, and it will be understood by those skilled in the art that various modifications are possible for combination of components or processes, and that such modifications are also within the scope of the present invention.

The first modification example will be described. On the library screen 50 of the above embodiment, when the alignment standard "Halfway Through" is selected, the video images of a plurality of games at the time of saving are sequentially displayed. As a modification example, the video images of a plurality of games at the time of saving may be sequentially displayed even when other alignment standards such as "Play Time" are selected. As another modification example, the video images of a plurality of games at the time of saving may be displayed in parallel on the library screen 50, instead of sequentially displaying the video images of a plurality of games at the time of saving.

A second modification example will be described. The management server 102 may include some of the functions of the game device 200 described in the embodiment. For example, the management server 102 may generate data of the library screen 50, the pop-up menu 60, the detail screen 70, and the like and transmit the data to the game device 200 for display. That is, the user interface described in the embodiment may be achieved by an information processing system in which the game device 200 and the management server 102 are linked.

Any combination of the embodiments and modification examples described above is also useful as an embodiment of the present disclosure. The new embodiments resulting from the combination have respective effects of the combined embodiments and modification examples. In addition, it is also understood by those skilled in the art that the functions to be fulfilled by each of the components described in the claims are attained by a single component or a cooperation of components exhibited in the embodiments and modification examples.

INDUSTRIAL APPLICABILITY

The present invention can be used in a system for processing electronic content.

REFERENCE SIGN LIST

22: Play data storage section
32: Reproducing section
34: Output section
44: Library screen generating section
46: Detail screen generating section
100: Multimedia reproduction system
102: Management server
200: Game device

The invention claimed is:

1. A method comprising:
storing, in memory and for each of a plurality of content items, play data that includes video from a content item at a time associated with saving a state of the content item;
generating a selection screen, for selecting a content item to be played from the plurality of content items;

retrieving the play data associated with each item on the selection screen from the memory;

generating an image representing first play data of a first content item of the plurality of content items, wherein the first play data includes video from the first content item at a time associated with saving a state of the first content item, wherein the video comprises video of a time period before or after a time of saving the state of the first content item; and causing the generated selection screen and the generated image to be displayed.

2. The method of claim 1, comprising:

causing video from a second content item of the plurality of content items to be displayed after the video from the first content item at the time associated with saving the state of the first content item.

3. The method of claim 1, wherein the video from the first content item at the time associated with saving the state of the first content item comprises:

video of a time period before and after a time of saving the state of the first content item.

4. The method of claim 1, comprising:

causing an indicator to be displayed on a representation of the first content item when causing the video from the first content item at the time associated with saving the state of the first content item to be displayed.

5. The method of claim 1, comprising:

generating information related to game play of the first content item, wherein causing the generated selection screen to be displayed comprises:

causing the information related to game play of the first content item to be displayed.

6. The method of claim 5, wherein generating information related to game play of the first content item comprises:

generating a play time indicator that indicates a play time of the first content item.

7. The method of claim 6, comprising:

arranging a position of the first content item within the plurality of content items based on a value of the play time indicator and at least one value of play time indicators generator for at least one other of the plurality of content items.

8. The method of claim 5, wherein generating information related to game play of the first content item comprises:

generating game plan data that indicates at least one current game plan of the first content item at the time associated with saving the state of the first content item.

9. One or more non-transitory computer storage media encoded with computer program instructions that when executed by one or more computers cause the one or more computers to perform operations comprising:

storing, in memory and for each of a plurality of content items, play data that includes video from a content item at a time associated with saving a state of the content item;

generating a selection screen, for selecting a content item to be played from the plurality of content items;

retrieving the play data associated with each item on the selection screen from the memory;

generating an image representing first play data of a first content item of the plurality of content items, wherein the first play data includes video from the first content item at a time associated with saving a state of the first content item, wherein the video comprises video of a time period before or after a time of saving the state of the first content item; and causing the generated selection screen and the generated image to be displayed.

10. The media of claim 9, wherein the operations comprise:

causing video from a second content item of the plurality of content items to be displayed after the video from the first content item at the time associated with saving the state of the first content item.

11. The media of claim 9, wherein the video from the first content item at the time associated with saving the state of the first content item comprises:

video of a time period before and after a time of saving the state of the first content item.

12. The media of claim 9, wherein the operations comprise:

causing an indicator to be displayed on a representation of the first content item when causing the video from the first content item at the time associated with saving the state of the first content item to be displayed.

13. The media of claim 9, wherein the operations comprise:

generating information related to game play of the first content item, wherein causing the generated selection screen to be displayed comprises:

causing the information related to game play of the first content item to be displayed.

14. The media of claim 13, wherein generating information related to game play of the first content item comprises:

generating a play time indicator that indicates a play time of the first content item.

15. The media of claim 14, wherein the operations comprise:

arranging a position of the first content item within the plurality of content items based on a value of the play time indicator and at least one value of play time indicators generator for at least one other of the plurality of content items.

16. The media of claim 13, wherein generating information related to game play of the first content item comprises:

generating game plan data that indicates at least one current game plan of the first content item at the time associated with saving the state of the first content item.

17. A system comprising:

one or more computers and one or more storage devices on which are stored instructions that are operable, when executed by the one or more computers, to cause the one or more computers to perform operations comprising:

storing, in memory and for each of a plurality of content items, play data that includes video from a content item at a time associated with saving a state of the content item;

generating a selection screen, for selecting a content item to be played from the plurality of content items;

retrieving the play data associated with each item on the selection screen from the memory;

generating an image representing first play data of a first content item of the plurality of content items, wherein the first play data includes video from the first content item at a time associated with saving a state of the first content item, wherein the video comprises video of a time period before or after a time of saving the state of the first content item; and causing the generated selection screen and the generated image to be displayed.

18. The system of claim 17, wherein the operations comprise:

causing video from a second content item of the plurality of content items to be displayed after the video from the first content item at the time associated with saving the state of the first content item.

19. The system of claim 17, wherein the video from the first content item at the time associated with saving the state of the first content item comprises:

video of a time period before and after a time of saving the state of the first content item.

20. The system of claim 17, wherein the operations comprise:

causing an indicator to be displayed on a representation of the first content item when causing the video from the first content item at the time associated with saving the state of the first content item to be displayed.

* * * * *